United States Patent [19]

Danby et al.

[11] Patent Number: 4,548,023
[45] Date of Patent: Oct. 22, 1985

[54] METHOD AND APPARATUS FOR FORMING A PLASTIC ENCLOSURE FOR FLUIDS WITH SELECTIVELY INTERCONNECTABLE INTERNAL COMPARTMENTS

[75] Inventors: Hal C. Danby, Palo Alto; Carl Ritson, San Jose, both of Calif.

[73] Assignee: Anatros Corporation, San Jose, Calif.

[21] Appl. No.: 223,931

[22] Filed: Jan. 9, 1981

[51] Int. Cl.⁴ .............................................. B65B 47/04
[52] U.S. Cl. ..................................... 53/452; 604/262; 604/410
[58] Field of Search ................. 53/452, 456, 469, 473; 604/410, 416, 262; 141/114, 325; 493/931, 916

[56] References Cited

U.S. PATENT DOCUMENTS

| | | | |
|---|---|---|---|
| 2,524,687 | 10/1950 | Uhlig | 53/469 X |
| 2,691,259 | 10/1954 | Weckesser | 53/452 |
| 2,876,602 | 3/1959 | Ditlea | 53/469 |
| 3,251,915 | 5/1966 | Pechthold | 53/452 X |
| 3,257,072 | 6/1966 | Reynolds | 604/410 X |
| 4,146,172 | 3/1979 | Cullis et al. | 604/410 X |

Primary Examiner—Horace M. Culver
Attorney, Agent, or Firm—William B. Walker

[57] ABSTRACT

An apparatus and a method for forming a compartmentalized flexible plastic enclosure with selectively communicable compartments utilizing a pair of plates and at least one thin plastic sheet sandwiched between the plates. One plate has a surface which is conventionally plane facing the sheet and the other plate has a surface which includes a network of ridges facing the sheet and forming a sealing edge by pressure contact. The ridges defining at least the interior compartment of the bag to be formed with gaps in the ridges for defining communication channels between the compartments and valves disposed to close the gap in one position and to open the gap in the other position.

4 Claims, 17 Drawing Figures

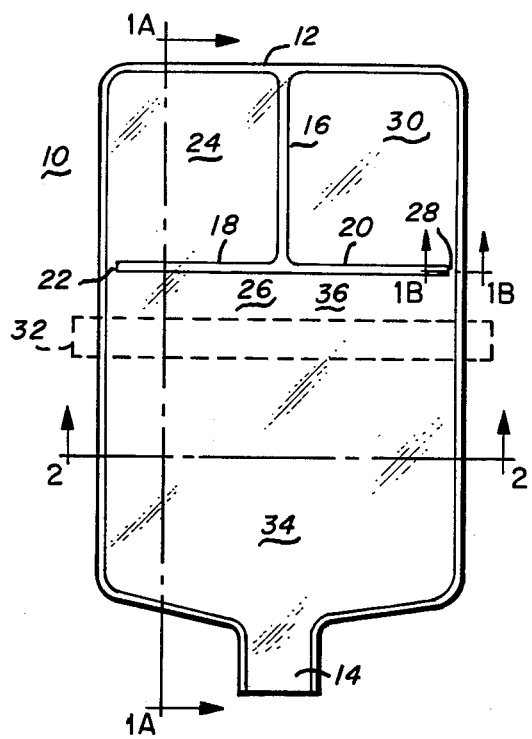
Fig_1 (PRIOR ART)
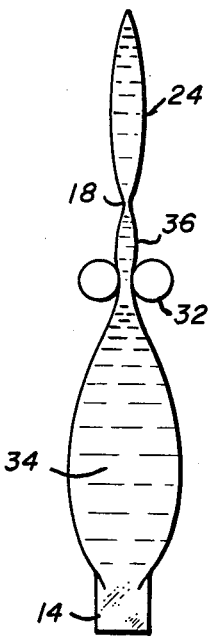
Fig_1A (PRIOR ART)
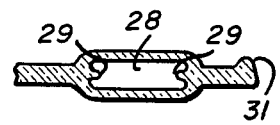
Fig_1B (PRIOR ART)
Fig_2A (PRIOR ART)
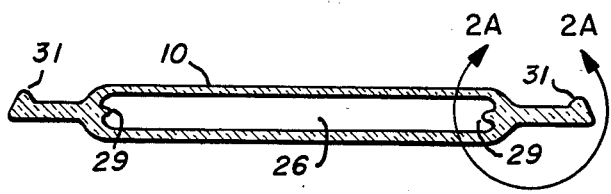
Fig_2 (PRIOR ART)
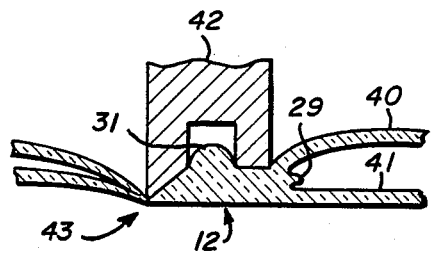
Fig_3 (PRIOR ART)
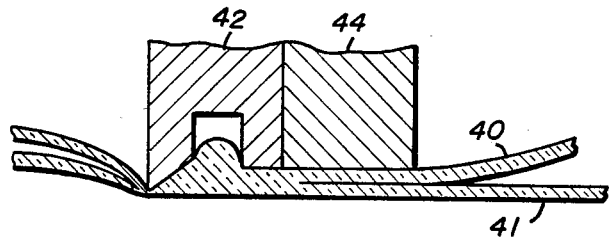
Fig_4 (PRIOR ART)
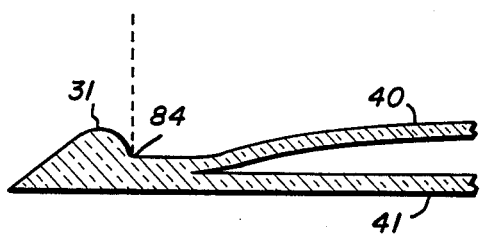
Fig_4A (PRIOR ART)
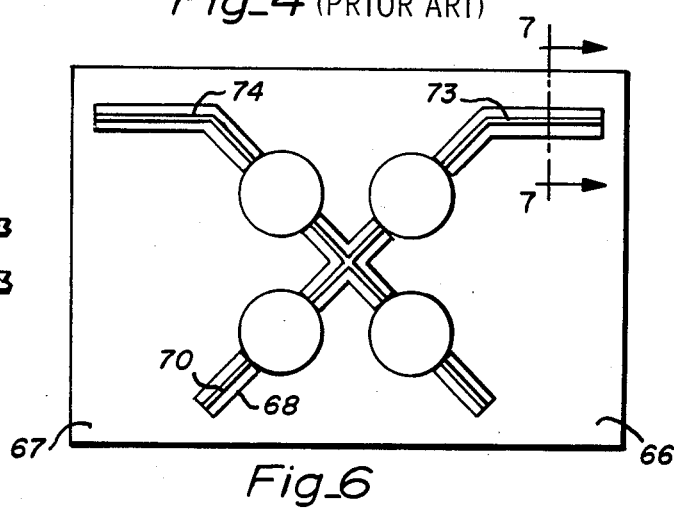
Fig_6

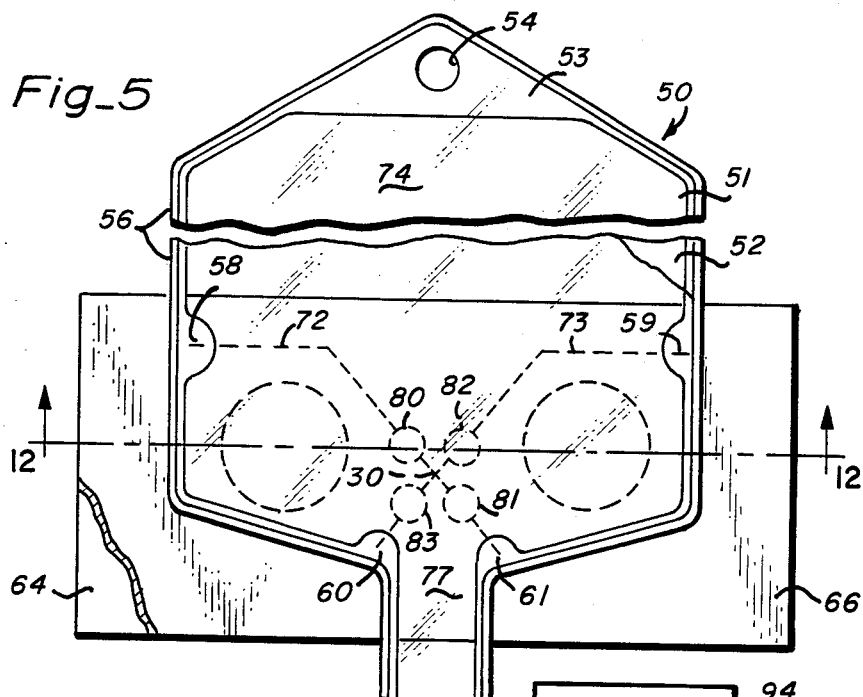
Fig_5
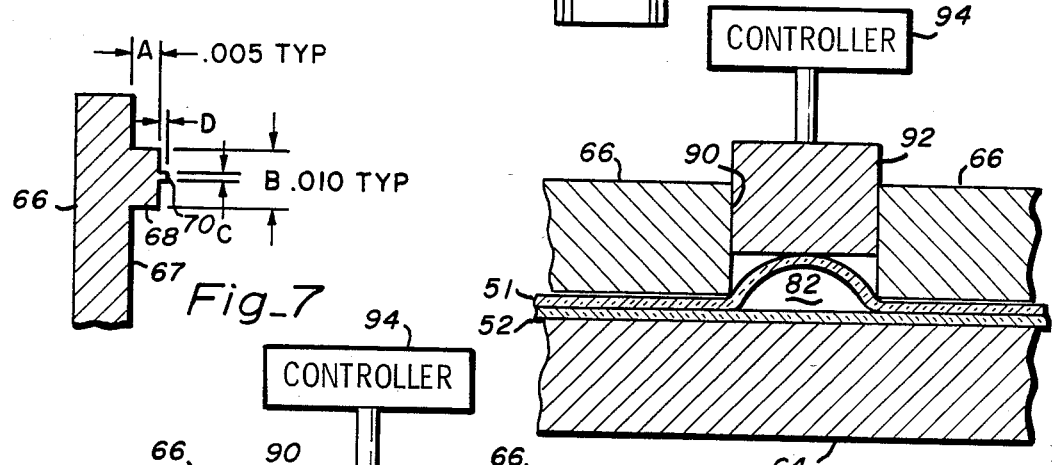
Fig_7
Fig_8
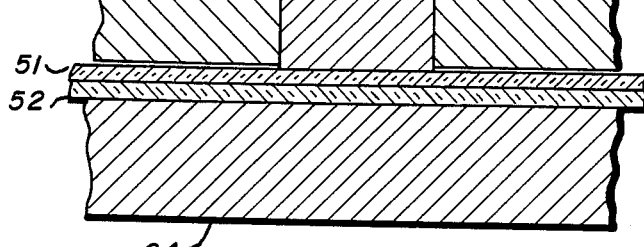
Fig_9
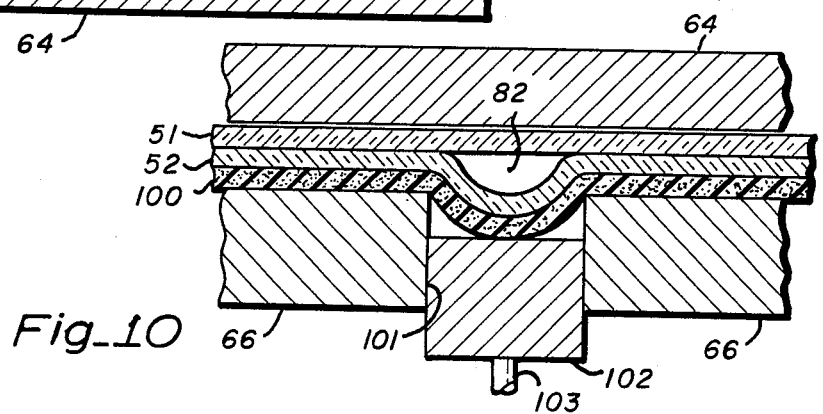
Fig_10

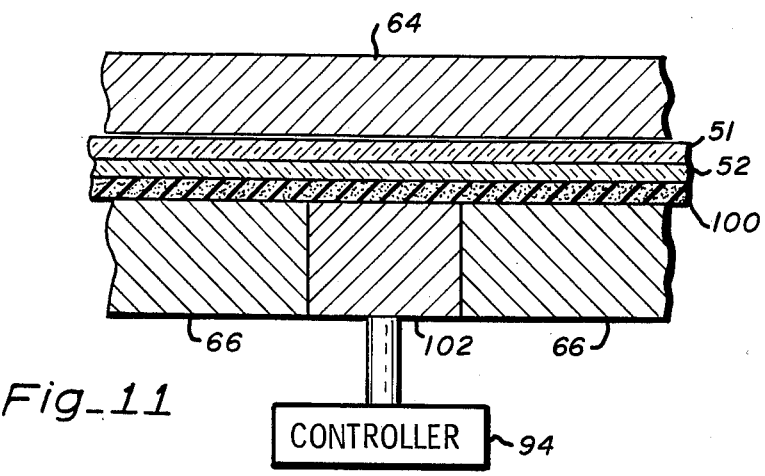
Fig_11
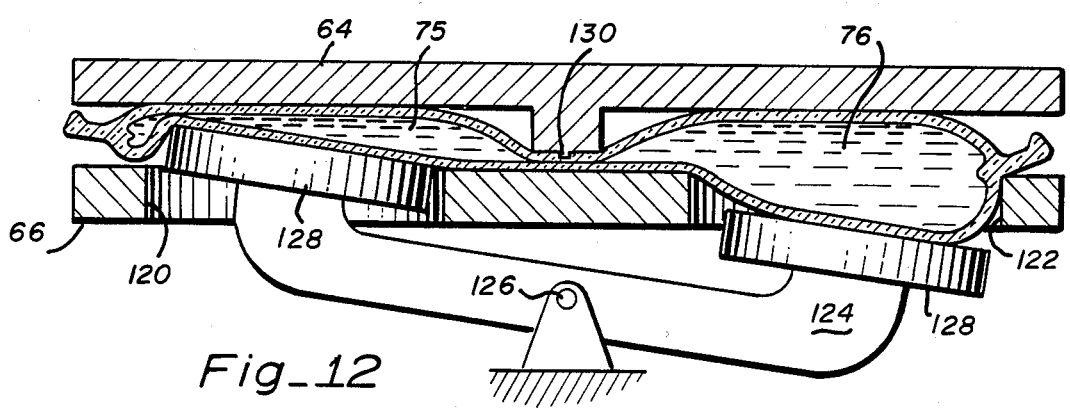
Fig_12
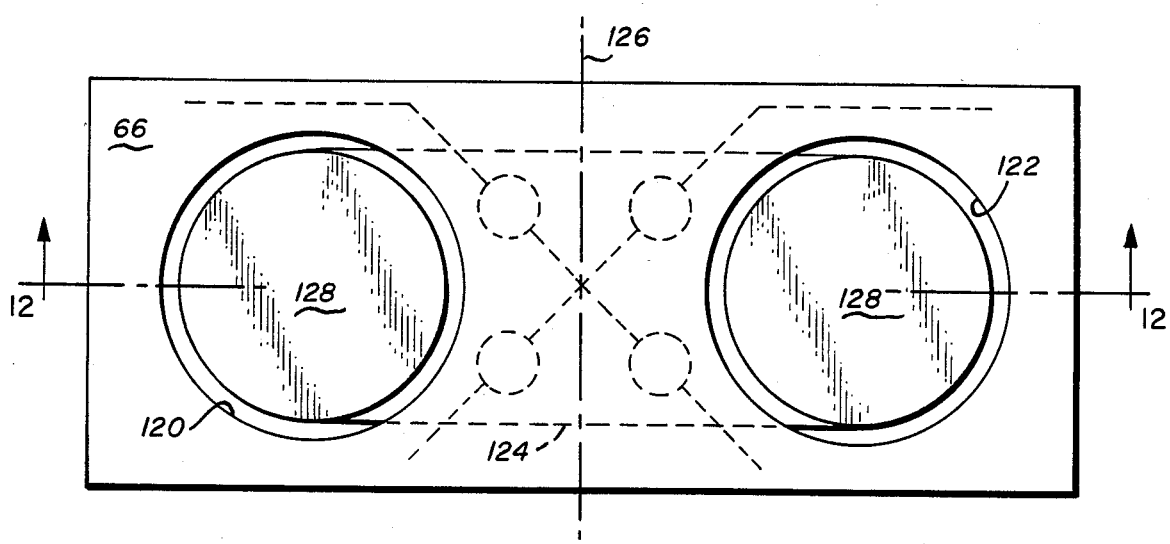
Fig_13

METHOD AND APPARATUS FOR FORMING A PLASTIC ENCLOSURE FOR FLUIDS WITH SELECTIVELY INTERCONNECTABLE INTERNAL COMPARTMENTS

BACKGROUND OF THE INVENTION

This invention relates to means and a method for compartmentalizing the interior of a plastic enclosure and for selectively communicating the compartments so formed.

It is often desirable to compartmentalize a flexible transparent container, commonly known as a plastic bag, to separate contents and to control the flow of fluid either through the bag or between compartments. For example, U.S. Pat. No. 3,257,072 to Reynolds discloses a flexible plastic bag to store whole blood which is compartmentalized to separately store the plasma and red blood cells into which the whole blood is separated by centrifugal action. For that purpose, the plastic bag is divided by welding into several compartments which are communicable with one another through openings which can be closed by pinch type devices and, in fact, the entire bag across its width can be divided into separate compartments by an external clamping member which is applied across the bag.

Another example for controlled fluid flow within and out of a plastic bag is diclosed in application Ser. No. 972,730 filed on Dec. 26, 1978 and assigned to the same assignee as this application, now U.S. Pat. No. 4,237,881 to Beigler et al, in which the plastic bag is filled with a fluid suitable for the intravenous or enteric infusion into the human body. The plastic bag is divided, by a network of fluid passages which are integral with and welded into the plastic bag, into a large storage compartment for controlling fluid flow, and a discharge opening. Valve means are associated with the various fluid passages for selectively connecting the first and the second compartments, respectively, to the storage compartment and the discharge opening in one mode, and to the discharge opening and the storage compartment in another mode.

Even though plastic bags compartmentalized by welding accomplish the intended purpose, they have a number of disadvantages which detract from their efficiency, convenience, and ease of fluid control. For example, most plastic bags of the type referred to above are comprised of a pair of overlying thin flexible sheets of a thermoplastic material which are welded together at their peripheral edges to form the bag in the first instance. As will be explained hereinafter in more detail, the weld is formed by pressing a welding element to which a high frequency signal is applied into the material to produce a weld. Such welds create a bead which runs along either side of the weld and which is formed by the material displaced when the weld is made. This bead interferes with the pinch type devices and the clamping members devices of the type shown, for example, in Reynolds U.S. Pat. No. 3,257,072, to close openings and to divide the bag, and also with the valves of the type shown, for example, in Beigler et al U.S. Pat. No. 4,237,881, to close the fluid ducts because it acts as an obstruction to sealing across the bead.

In order to overcome the bead obstruction found at the weld edges, which exist at the edge of the bag or an opening, it is necessary to utilize pinch type devices and clamping members which are capable of exerting not only a force sufficiently strong to close an opening, but also sufficient to compress the bead so that it does not interfere with the closing or the opening. In other words, to separate an entire bag welded at its edges or to close a duct or passage created by a gap along an internal weld, requires the application of forces very much in excess of the normal forces required to divide the bag or to close passages since the clamping force must be large enough to compress the weld beads at the edges of the bag or the ends of the passage.

It is therefore a primary object of the present invention to compartmentalize the space between two sheets of thin, flexible thermoplastic material without welding.

It is a further object of the present invention to form a plastic bag with two or more compartments in which the edge of the compartments so formed, as well as any opening between compartments, are obstructionless so that they can be opened and closed with the application of normal or minor clamping forces making it unnecessary to apply forces to overcome the effect of the welding bead.

It is a further object of the present invention to provide a compartmentalized fluid enclosure with at least one valved interconnecting passage between compartments in which the compartment edges are formed impermanently by a pressurized ridge.

It is another object of the present invention to provide a normally welded plastic bag with means at localized portions along the peripheral edge which are obstructionless and which make the bag dividable by a pressurized ridge without the application of forces to compress the weld bead.

It is still a further object of the present invention to provide a means and method of forming a plastic bag and of internally compartmentalizing the plastic bag in a manner that is obstructionless across the compartment edges and which therefor allow for the convenient control of fluid between compartments.

It is another object of the present invention to form a plastic bag out of flexible materials which are not thermoplastic or readily sealed wherein the film material is sealed to a like material by means of the pressurized ridge.

SUMMARY OF THE INVENTION

Briefly, the present invention accomplishes the above stated, and many other, objects by compressing a pair of thin, flexible sheets of material between a pair of plates, one of which is conventionally plane and the other of which, also referred to as a cookie cutter, has a number of projecting ridges for defining the edges of the compartments to be formed, and gaps in the ridges for defining openings between adjacent compartments. These ridges may either form only the interior compartment of a bag having a peripheral weld, or the peripheral bag boundary as well. Associated with each gap in the ridges is a movable valve element which is normally biased in the closed position and which is retracted to allow fluid to pass through the opening from one compartment to another. If the ridges are utilized to only internally compartmentalize a welded bag, the weld portion where a ridge must seal against the weld is made without a bead utilizing a special welding technique involving a pressure and heat gradient controller such as shown in U.S. Pat. No. 3,379,595 to Bracey.

BRIEF DESCRIPTION OF THE DRAWINGS

FIG. 1 is a simplified plastic bag of the prior art including welded peripheral edges as well as a welded internal seams with fluid passages;

FIG. 1A is a cross sectional view taken along lines 1A—1A of FIG. 1;

FIG. 1B is an enlarged view in cross section of the encircled portion of FIG. 1;

FIG. 2 is a cross sectional view taken along lines 2—2 of FIG. 1;

FIG. 2A in an enlarged view in cross section of the encircled portion of FIG. 2;

FIG. 3 is a cross sectional view of a welding tool for welding the edge of a plastic bag, such as the one shown in FIG. 1, and the resulting bead;

FIG. 4 is a cross sectional view of a welding tool for welding a Delrin fence resulting in an obstructionless weld;

FIG. 4A shows an obstructionless weld constructed with the tool shown in FIG. 4;

FIG. 5 is a plane view in diagrammatic form of a means for compartmentalizing a plastic bag in accordance with the present invention;

FIG. 6 is a plane view of the ridged surface of the upper plate of FIG. 5;

FIG. 7 is an enlarged cross sectional view taken along line 7—7 of FIG. 6;

FIG. 8 is an enlarged cross sectional view taken along line 8—8 of FIG. 5 showing the valve in an open position;

FIG. 9 is a view, similar to the view shown in FIG. 8, but with the valve shown in the closed position;

FIG. 10 is an alternate embodiment of the valve and passage control shown in FIG. 8 with the valve in the open position;

FIG. 11 is a view similar to the view of FIG. 10 but with the valve shown in the closed position;

FIG. 12 is a cross sectional view taken along line 12—12 of FIG. 5 of an embodiment of the present invention in which one end of a teeter totter is pressurized by one compartment and the other end is utilized to pressurize another compartment of the compartmentalized plastic bag; and FIG. 13 is a plane view of the lower plate of FIG. 5 with access occur openings for the teeter totter which is shown in place.

DETAILED DESCRIPTION OF THE DRAWINGS

To bring the problems of the prior art this invention overcomes into sharp focus, a discussion of these problems with the aid of FIGS. 1-4 will precede a description of the invention.

FIG. 1 discloses a prior art plastic bag 10 of the multiple compartment, clear container type described in U.S. Pat. No. 3,257,052 as a useful bag for blood storage and for centrifugally separating the red cells from the plasma and moving them into separate storage areas. Typically, bag 10 is constructed of two thin, flexible, transparent sheets of a thermoplastic material, such as polyvinyl chloride (PVC), having a thickness of 0.015 inches each. The entire perimeter of bag 10 is welded at 12 except for defining an opening at 14. Further, interior compartments 24, 26 and 30 are formed by weld seams 16, 18 and 20. Weld seam 18 has a gap 22 to define an opening between compartments 24 and 26 and weld seam 20 has an opening 28 to define an opening 28 between compartments 30 and 26. Further, and referring now particularly to FIG. 1A, a clamp schematically illustrated at 32 can be utilized to further divide compartment 26 into compartments 34 and 36.

Openings 22 and 28 are normally closed with pinch type clamps (not shown) and bag 10 has its compartment 26 divided into compartments 34 and 36 by a clamp 32. As will become better understood hereinafter, pinch type clamps for closing openings 22 and 28, as well as clamp 32, will have to exert considerable forces to close off and seal the various compartments. The reason for the requirements of these considerable forces is found in the nature of weld seal.

Referring initially to FIG. 1B, there is shown an enlarged cross sectional view of opening 28 disclosing the existence of welding beads 29 at either end. Further shown is another bead 31 which is part of the welded edge seam of bag 10. When utilizing a pinch type clamp to close opening 28, it is clear of course from FIG. 1B that such a clamp must clear bead 31 and must be sufficiently strong to compress beads 29 on either side of opening 28 to assure complete closure thereof. Referring now to FIG. 2, which is a cross sectional view taken along line 2—2 of FIG. 1, there are shown the edge weld on either side, each having a weld bead 29. In order for clamp 32 to divide compartment 26 into compartments 34 and 36, as shown in FIG. 1, it will be necessary that the clamp clear end beads 31 and have enough force to compress beads 29. FIG. 2A shows an enlarged section of the edge of compartment 34, and is useful in showing the existence of beads 29 and 31. Again, the presence of bead 29, which is in the nature of an obstruction in closing opening 34, is an inherent result of edge welding of plastic bags.

Referring now to FIG. 3, there is shown a top sheet or film 40 and a bottom sheet or film 41 of a thermoplastic thin flexible material, and a welding tool 42 which is heated and which comes down on the two sheets to create the peripheral sealed or welded edge 12 of a bag such as bag 10. As welding tool 42 compresses the material it is to weld, the excess material forms the extrusion edge 31 as well as the extrusion bead 29 and the outer edge of the weld, as indicated at 43, is removed after the bag is welded.

FIG. 4 illustrates a prior art welding method which is similar to the one illustrated in FIG. 3 except that it does not leave an internal extrusion bead 29. To avoid such a bead, welding tool 42 has attached to it an insulating shoulder 44 which is merely an extension of the welding tool made of a plastic material which prevents any extrusion of the material and thereby forms an obstructionless edge as shown in FIG. 4A. Closing and opening an opening like the one formed with a Delrin fence tool requires no more than normal closing forces since there is no extrusion bead 29 which has to be compressed prior to the opening being sealed.

Utilizing a Delrin shoulder or a shoulder made of a material which is a poor heat conductor, as illustrated in FIG. 4, to avoid the objectionable extrusion bead 29 is often not convenient, particularly in those instances where a carefully dimensioned opening is required along an internally welded seam. Further, it is more costly to utilize a Delrin fence and the lack of control of providing an opening of a predetermined dimension makes this a cumbersome solution to the problem of creating a precisely dimensioned opening which is beadless and therefor obstructionless.

Referring now to FIG. 5, which discloses the present invention, there is shown a plastic bag 50 formed of a pair of sheets of material 51 and 2 which is closed at the top at 53 with an opening 54 in portion 53 through which the bag may be conveniently hung for dispensing fluid, under the force of gravity, from an exit port or opening 55. Bag 50 is formed in the normal manner explained in connection with FIGS. 1–3 so that there will be an internal bead such as 29 and an external bead such as 31 along the periphery 56 of bag 50. It is also to be noted that four obstructionless areas 58, 59 60 and 61 are formed near exit port 55 for purposes to be explained hereinafter. Areas 58–61 are formed in the manner explained in connection with FIG. 4 known as fence areas which do not have an internal bead like 29 but do have an external bead like 31.

Bag 50 is compartmentalized with the help of a lower plate 64, also referred to as a planar base member, and an upper plate also referred to as a ridge member. Normally, lower plate 64 and upper plate 66 are of the same size and are urged against one another by clamps not shown in the drawings.

Referring now to FIGS. 6 and 7, there is shown surface 67 of upper plate 66 which is in direct contact with bag 50. Plate 66 is provided with a number of lands or elevated platforms 68 extending out of surface 67 and which carry a centrally disposed ridge 70 which, when assembled, will press into a sheet 51 like a cookie cutter and seal the same against sheet 52. The height "A" of lands 68 i.e., the distance it projects outwardly from surface 67, is not important as long as it is sufficiently large to allow the bag to form compartments of desirable thickness adjacent to it and also allows the height of the ridges to be within the limits set forth below. Likewise, the width "B" of land 68 is likewise not critical, but should be large enough to allow the placement of ridge 70 thereon and small enough to allow the bag to expand without undue interference to form a compartment of a desired size.

Ridges 70 are dimensioned for best performance in the following manner. The width "C" of ridges 70 should be sufficiently large so that it will not act as a knife to cut the thermoplastic material when it is pressed against sheet 51 to cause a seal between it and sheet 52 along the ridge. On the other hand, width "C" should be as small as is consistent with preventing damaging of the bag so that the force with which plate 66 is urged against plate 64 is within reasonable bounds such as, for example, 5 lbs/sq. in. An acceptable comprises is reached for a sheet thickness of 0.015 inches by making width "C" equal to 0.010 inches. In other words, through trial and error it has been determined that a ridge width of approximately two-thirds of sheet thickness is a reasonable compromise. Lastly, the height "D" of the ridge has likewise been found by trial and error and should be selected sufficiently short so as not to penetrate too deeply into the material which it is to seal and sufficiently large to provide a good linear seal. A dimension "C" approximately equal to one-half of the thickness of each sheet has been found to be an acceptable compromise so that for an upper sheet of 0.015 inches, a ridge height of 0.007 inches is adequate.

At this point, it should be noted that plate 66, configured as shown in FIG. 6 and placed on the bag as shown in FIG. 5, creates a number of compartments which will now be described. Ridge 72 extends from pad 58 to pad 61 and ridge 73 extends from pad 59 to pad 60. In this manner four compartments, or three compartments and an exit space are created as follows, a storage compartment 74, and first compartment 75, a second compartment 76, and an exit compartment or exit port 77. This is best seen in FIG. 5 where the ridge lines have been shown as dotted lines. Ridge 72 has two gaps namely gap 80 and gap 81 and ridge 74 has two gaps namely gap 82 and gap 83.

It should also be noted that the end of ridges 72 and 73 extend across the bead at the outer portion of the weld line and terminate before reaching bead 31 as shown in FIG. 4A. On the other hand, the ridges do extend to a point which is beyond the opening edge and which abuts the welded seam as indicated as 84 in FIG. 4A. The reason for this is that the ridge, in order to seal against the welded seam, must seal on an obstructionless pad, such as 58, and must extend far enough into the welded portion so that it overlies at least some of the weld. On the other hand, it should not extend to bead 31 because this would defeat the purpose and would again require additional forces to compress the bead in order to establish a good seal.

Openings 80, 81, 82 and 83, as is best seen in FIG. 5 establish the following communication channels. Opening 80 communicates storage compartment 74 with first compartment 75, opening 83 communicates first compartment 75 with exit compartment 77, opening 82 communicates storage compartment 74 with second compartment 76, and opening 81 communicates second compartment 76 with exit compartment 77. Openings or gaps 80, 81, 82 and 83 are associated with a valve element, such as a piston, which may either be located in upper plate 66 as shown in FIGS. 8 and 9 or in base plate 64 as shown in FIG. 10 and FIG. 11.

Referring now to FIGS. 8 and 9, there is shown a fragmentary enlarged cross sectional view of gap 82 in which upper plate 66 is provided with an opening 90 which has positioned in it a piston 92 which is movable in opening 90 between an open and a closed position, the open position being shown in FIG. 8 and the closed position being shown in FIG. 9. Movement of valve piston 92 is accomplished by a controller 94 which is shown in schematic form. As a practical matter, valve piston 92 is normally biased in the closed position shown in FIG. 9 and is retracted by the controller which may be an electromagnetic relay or the like. When normally biased in the closed position, as shown in FIG. 9, valve piston 92 closes gap 82 so that no fluid can flow therethrough. If controller 94 is actuated to retract valve piston 92, a flow channel is formed between sheets 51 and 52 as best seen in FIG. 8 allowing fluid communication, for example, between storage compartment 74 and second compartment 76.

In a similar manner, valve pistons may also be formed in lower plate 66 as shown in FIG. 10, providing for the additional advantage of allowing control utilizing a flexible rubber pad 100 on the upper surface of lower plate 66. For that purpose, a valve opening 101 is provided in lower plate 60 and a valve piston 102 is movable within opening 101 between a closed and open position by some actuating mechanism not shown. It is to be noted that in this embodiment, sheet 52 is protected against damage from sharp corners or the like, by flexible rubber pad 100 which is urged outwardly to provide a flow channel 82.

The description of the invention set forth above, is fairly general but illustrates the important concept of this invention, namely to utilize ridges to provide a precise opening, such as 82, whose width can be controlled by a gap in the ridge rather than by welding. Further, having created an opening that does not have any internal beads, it is relatively simple to open and close the opening with a normal closing force rather than the utilization of a special force to compress the internal welding bead. Likewise, when a seal against the edge of the bag is to be established, an obstructionless pad is formed by a weld, such as explained in connection with FIGS. 4 and 4A and the ridges extended into the welded portion over the obstructionless weld portion created by a Delrin shoulder.

In Beigler et al U.S. Pat. No. 4,237,881, there is described a system for pressurizing a fluid to be infused into a patient and to pump a precisely controlled stream of fluid into the patient. Beigler et al describes a bag, of the type illustrated in FIG. 5, which utilizes a teeter totter means whose ends are respectively in contact with the first and the second compartments to establish fluid control. The exact means for this control do not form any portion of the present invention except that the versatility of the present invention is highly suitable for the Beigler et al dispenser. To this end, and referring now to FIGS. 12 and 13, lower plate 66 is provided with two large openings 120 and 122 with a teeter totter 124 suspended below the openings about a pivot 126 shown diagrammatically only. The ends 128 and 129 of teeter totter 126 are formed to pass through openings 120 and 122 respectively to make contact with the first and the second compartments 75 and 76 of bag 50. The space between compartments 75 and 76 is divided by the cross over point 130 between ridges 72 and 73. In operation, compartment 74 contains a pressurized fluid. When the valve associated with gap 82 is opened, second compartment 76 will be in communication with compartment 74 and pressurized fluids will enter as shown in FIG. 12. This fluid in turn will move the teeter totter in a clockwise direction as compartment 76 expands which causes compartment 75, which has been previously filled, to be compressed, if valves associated with gap 83 is open, compartment 75 will empty into exit port 55. During this operation, the valves associated with gap 80 and 81 are kept closed.

It is to be understood that material 50 and 51 is usually a thermoplastic, or at least a heat sealable, material to allow welding of these portions of the bag where a bead obstruction is unobjectionable. However, in the case that the entire bag is formed by ridges i.e., the cookie cutter, a much wider range of material is available which includes, without limitations, all heat sealable materials, TFE, PVC, wax paper, rubber, aluminum foil, etc.

It is also to be understood that in another embodiment of the present invention upper plate 66 may be constructed of a non-rigid material such as rubber or neoprene which is readily formed by molding and requires little machining. If such a non-rigid material is employed, it is usually desirable to provide a back up plate for clamping the non-rigid upper plate across the film forming the bag to the lower plate. In a further embodiment of the present invention, sheet 51 or 52 may be integrally formed with ridges depending downwardly or upwardly, respectively, such as 72 and 73 as well as ridges defining the bag perimeter. In this case, upper plate 66 would have a planar surface facing sheet 51 and the planar surface may either be rigid or resilient.

There has been described a means and a method for compartmentalizing a plastic bag utilizing ridges and for communicating the compartment of a selective basis by utilizing valves associated with gaps in the ridges. There has also been described a means of extending a sealing ridge to the welded seam forming the edge of the bag by providing an obstructionless pad. It is to be understood that instead of utilizing two bags, these compartments and the selective communication can be formed with a single sheet with the bag being formed between the lower plate and a single sheet of thermoplastic material. This would be most suitable in connection with the dispensing of fuilds in food and drink establishment places where it would be extremely simple to clean the interior of the bag by just cleaning the surface of the base plate and throwing the upper thermoplastic material away.

What is claimed is:

1. A method for forming a fluid containing bag with selectively interconnectable compartments comprising pressing a plurality of thin, flexible plastic sheets between a planar surfaced plate and a ridged plate having outwardly extending projections terminating in flat, substantially co-planar pinching surfaces, to form a plurality of compartments between the plastic sheets with fluid flow passageways therebetween, by effecting sealing engagement of the plastic sheet against a second surface in compartment defining fillet zones, and introducing fluid into at least one of the compartments.

2. A method of claim 1 wherein the fluid introduced into one of said compartments flows from another of said compartments through a fluid flow passageway therebetween.

3. The method of claim 2 wherein two plastic sheets of thermoplastic material are pinched between the surfaces of the plates to define compartments between the plastic sheets, and the two plastic sheets are sealed together by a weld around their periphery to form a bag and filled with fluid before being pinched between the plates.

4. The method of claim 3 wherein the weld is beadless adjacent the areas of the sheet contacted by the co-planar pinching surfaces of the ridged plate.

* * * * *